United States Patent [19]

Deal et al.

[11] Patent Number: 5,655,891
[45] Date of Patent: Aug. 12, 1997

[54] POSITIVE-DISPLACEMENT PUMP

[75] Inventors: Michel Deal, St.-Remy-En-Rollat; Henri Hinc, Chamalieres, both of France

[73] Assignee: Sedepro, Paris, France

[21] Appl. No.: 471,566

[22] Filed: Jun. 6, 1995

[30] Foreign Application Priority Data

Jun. 28, 1994 [FR] France ............... 94 08303

[51] Int. Cl.$^6$ ............... F04B 23/08; F04B 1/12
[52] U.S. Cl. ............... 417/269; 417/201; 417/205; 417/900
[58] Field of Search ............... 407/201, 205, 407/269, 490, 900

[56] References Cited

U.S. PATENT DOCUMENTS

| 3,143,076 | 8/1964 | Pyritz . | |
|---|---|---|---|
| 3,295,451 | 1/1967 | Smith . | |
| 3,327,640 | 6/1967 | Townsend . | |
| 3,411,294 | 11/1968 | Hedermann | 417/269 |
| 4,756,239 | 7/1988 | Hattori et al. | 417/269 |
| 4,838,765 | 6/1989 | Wostof et al. | 417/269 |
| 5,261,795 | 11/1993 | Laurent et al. . | |
| 5,336,052 | 8/1994 | Zöllner et al. | 417/205 |

FOREIGN PATENT DOCUMENTS

| A 572925 | 6/1924 | France . | |
|---|---|---|---|
| A 1522530 | 3/1968 | France . | |
| C 844535 | 5/1952 | Germany . | |
| 5071469 | 3/1993 | Japan | 417/269 |
| A 792081 | 3/1958 | United Kingdom . | |

*Primary Examiner*—Charles G. Freay
*Attorney, Agent, or Firm*—Brumbaugh, Graves, Donohue & Raymond

[57] ABSTRACT

The pump includes two pistons 10 each sliding in a cylinder 11. These are fed by a screw 21 through ports 12. Upon delivery, a rotary valve 6 turning in a bearing 1A2 in succession closes off and uncovers the passages 1A1 from the cylinders. This rotary valve 6 includes an axial bore 61 and a slot 62 through which the material collected from the cylinders passes in the direction of the outlet orifice of the pump.

18 Claims, 5 Drawing Sheets

POSITIVE-DISPLACEMENT PUMP

BACKGROUND OF THE INVENTION

The present invention relates to the positive-displacement pumping of highly viscous materials, such as unvulcanized rubber.

The manufacture of rubber products requires the capability of extruding products while metering them quantitatively in a very accurate manner. Among the many applications which may be envisaged, mention may be made of the formulation of rubber mixes which requires accurate metering of various basic constituents, or the assembly of a finished product, such as a tire, which requires strictly defined amounts of rubber mixes to be extruded onto a rotating support.

In the latter case, the problem is further compounded owing to the fact that in this type of application extrusion is not continuous, but takes place on demand, according to a cycle whose period corresponds to the time required to assemble each manufactured article, for example each tire. It is important to gain complete control over the quantities extruded, including during the stop and start-up phases of extrusion.

To this end, it is preferable to ensure that the flow rate of extruded material depends on just one control parameter of the pump, namely, for example, the speed of rotation of a control shaft, and for it to be dependent in such a way that the flow rate is at every moment strictly proportional to the speed of rotation of the control shaft. U.S. Pat. No. 5,261,795 discloses a positive-displacement pump which, in one of its alternatives, has two pistons and non-return balls controlled by rods and a rocker. This pump meets these objectives.

SUMMARY OF THE INVENTION

The object of the present invention is to improve such a pump, particularly to make it lighter in weight, for the same flow rate at a given speed, without in any way detracting from its volumetric accuracy. Another object of the invention is to make it easier for the delivered material to flow, because the formulations of rubber mix used in the applications to the tire industry can give products of very high viscosity.

The invention provides a positive-displacement pump for a viscous material, having a body including a supply opening for introducing the material into the pump, and an orifice for discharging the material from the pump, said pump including at least one delivery piston sliding in a cylinder between a bottom dead position and a top dead position, a delivery phase occurring during the stroke between the bottom dead position and the top dead position, said pump including inlet and delivery passages emerging in said cylinder or cylinders, said inlet and delivery passages being formed in said body at points which are separated from one another, each inlet passage being closed off by the delivery piston during its movement from the bottom dead position in the direction of the top dead position, said pump including means for filling said cylinder or cylinders with said material in the inlet phase, said pump including a rotary distributor provided with a recess in permanent communication with the outlet orifice, said recess being shaped so that said distributor, through rotating, places the cylinder in communication with said outlet orifice during the delivery phases of the corresponding piston, and isolates said cylinder from the outlet orifice intermediate the delivery phases.

By virtue of the use of a rotary distributor, the flow rate of the pump is very much improved for a given overall size of pump, with all other aspects being equal. In fact, by comparison with the pumps known from the aforementioned U.S. Pat. No. 5,261,795, additional pistons can more easily be accommodated.

In one of the aspects of the invention, said piston or pistons and said distributor of said pump are actuated mechanically and synchronously by one single mechanical control shaft. That does not, of course, preclude there being two kinematic chains, one actuating said piston or pistons, and the other actuating said distributor, or that these two kinematic chains combine upstream and are themselves driven by a single mechanical control shaft.

In a very advantageous alternative, using at least two delivery pistons, the amount of material expelled through the outlet orifice is directly proportional to the total swept angle of said control shaft. As a consequence, the flow rate of the pump is at every moment a function of the speed of rotation of the control shaft. Even when using a pump with just one piston corresponding to the characteristics of the invention, due to the direct and synchronous control of the piston and of the distributor, the mean flow rate, that is to say, the flow rate observed over a period of time greater than one cycle, is directly proportional to the speed of the control shaft. The pump of the invention makes it possible to insure a given flow rate by selecting an appropriate speed of actuation for the input shaft. This flow rate can thus be reproduced perfectly, at least for a given material.

In another aspect of the invention, the body includes a bearing in which said distributor turns, the latter and said bearing having matched surfaces of revolution, the recess in said distributor comprising a cutout ending at the surface of revolution of said distributor, and the body includes a passage for each cylinder, each passage connecting the discharge from a cylinder with the surface of revolution of said bearing at points which are uniformly and circumferentially spaced in line along said surface of revolution of said bearing, so that one same cutout passes across each of said passages in succession during its rotational movement, said cutout and said passages being shaped relative to one another so that said distributor, through rotating, places the cylinder in communication with said outlet orifice during the delivery phases of the corresponding piston, and isolates said cylinder from the outlet orifice outside of or intermediate the delivery phases.

DESCRIPTION OF THE DRAWINGS

In order to make the invention completely understood, two embodiments thereof are described, each with the aid of three figures.

DESCRIPTION OF PREFERRED EMBODIMENTS

Figure 1:
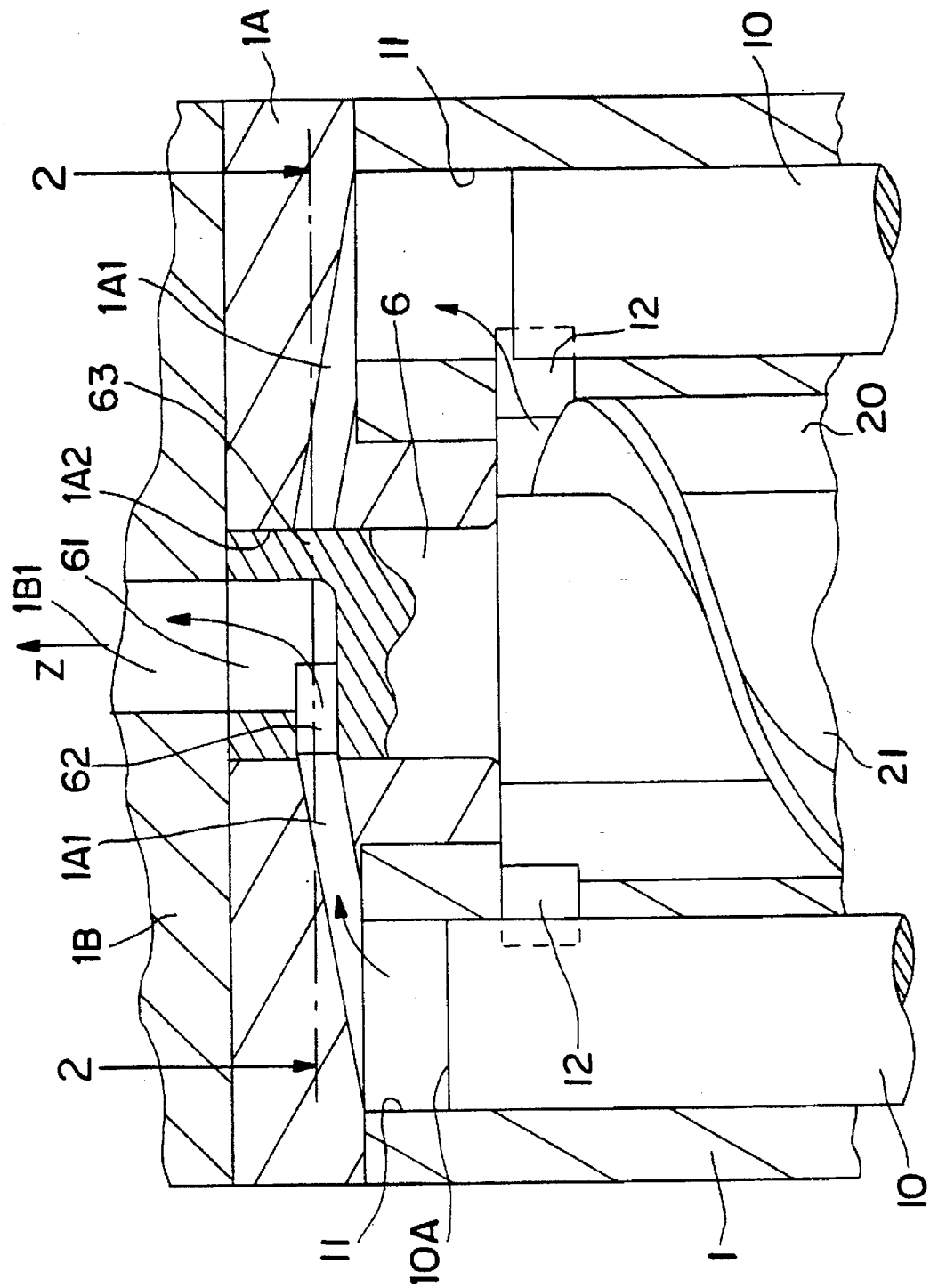
FIG. 1 is a section on 1—1 in FIG. 2.
Figure 2:
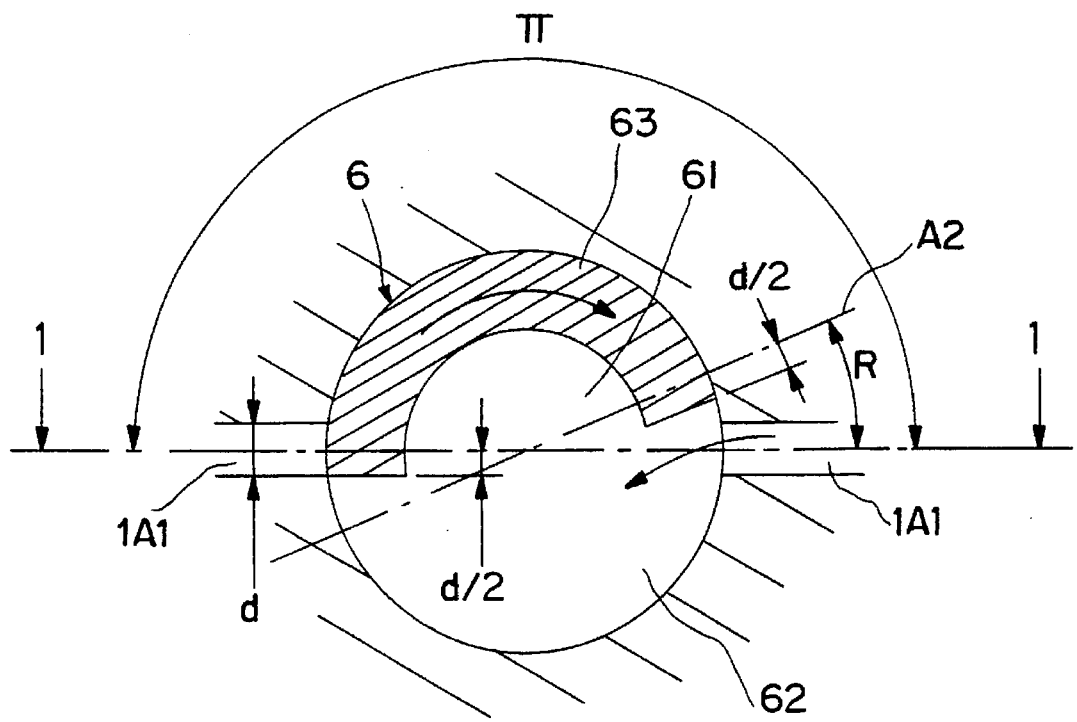
FIG. 2 is a section on 2—2 in FIG. 1.
Figure 3:
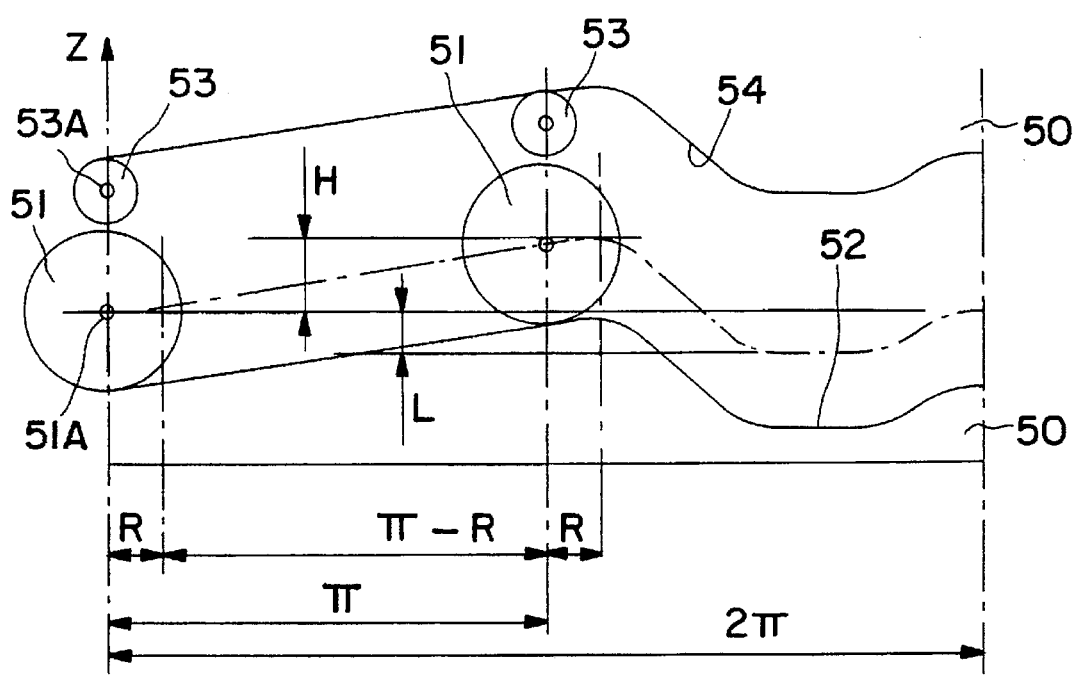
FIG. 3 illustrates the horizontal development of the cam used in the pump illustrated in FIGS. 1 and 2.
Figure 4:
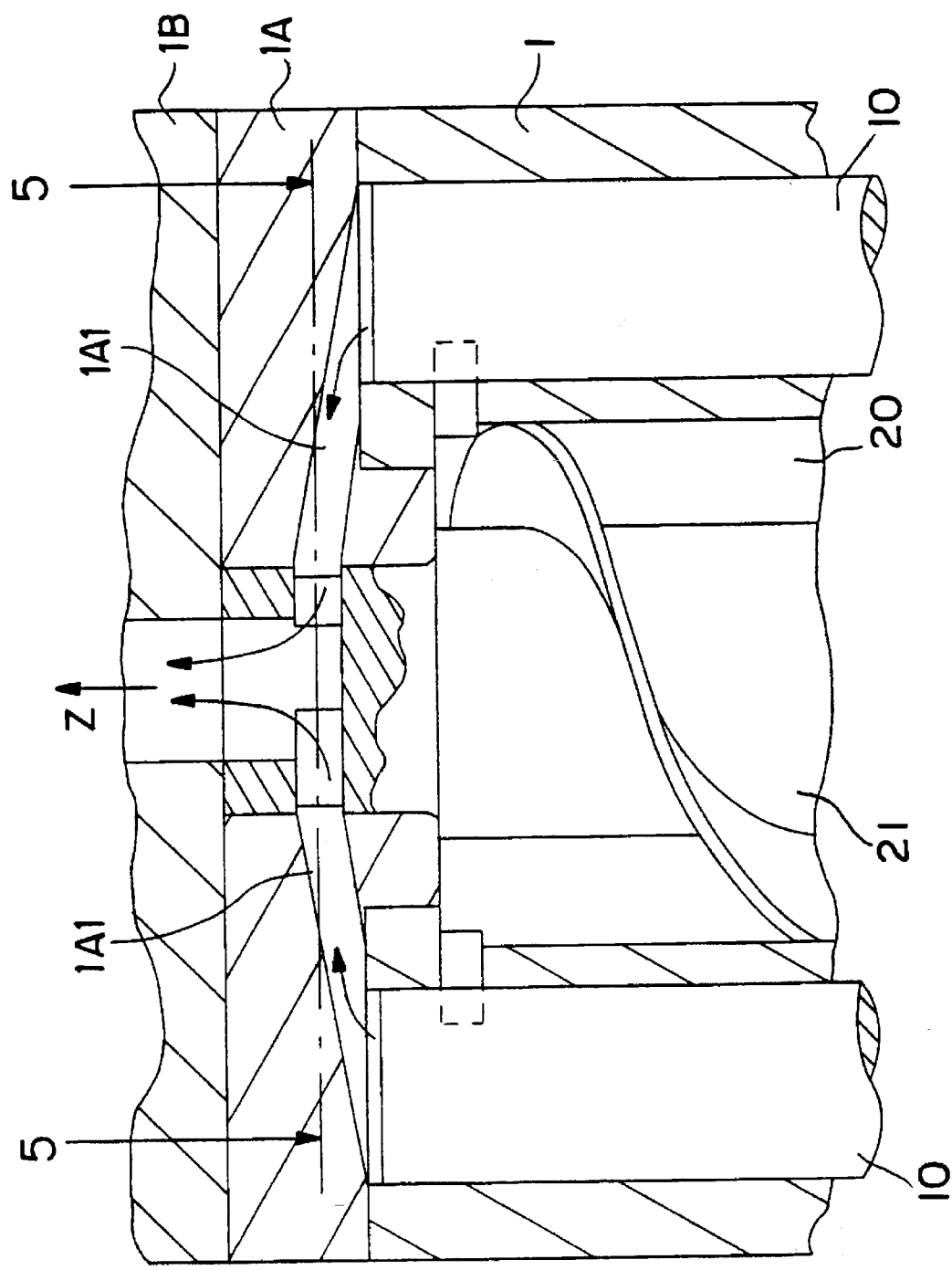
FIG. 4 is a section on 4—4 in FIG. 5.
Figure 5:
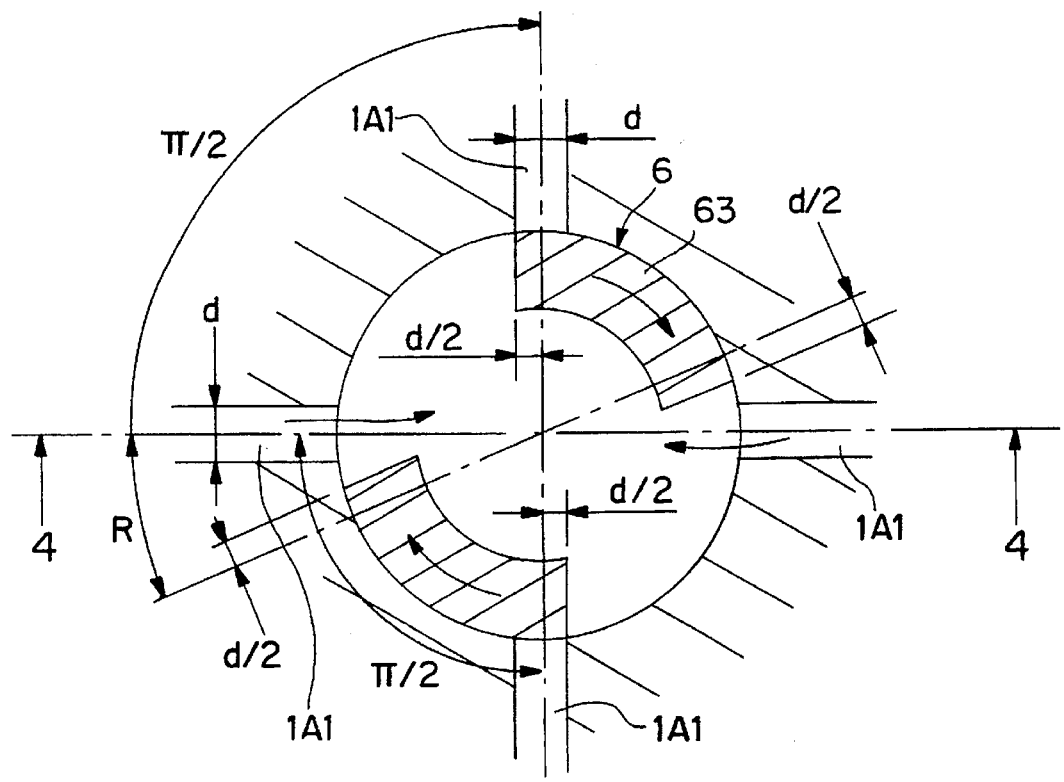
FIG. 5 is a section on 5—5 in FIG. 4.
Figure 6:
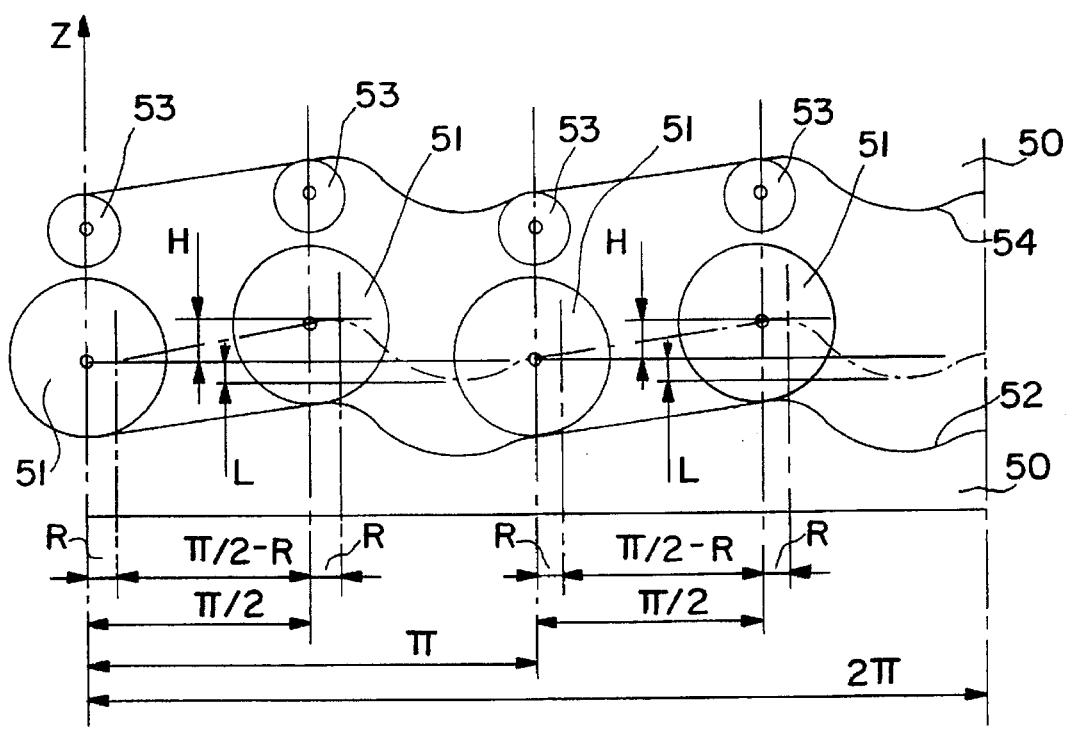
FIG. 6 illustrates the horizontal development of the cam used in the pump illustrated in FIGS. 4 and 5.
Figure 7:
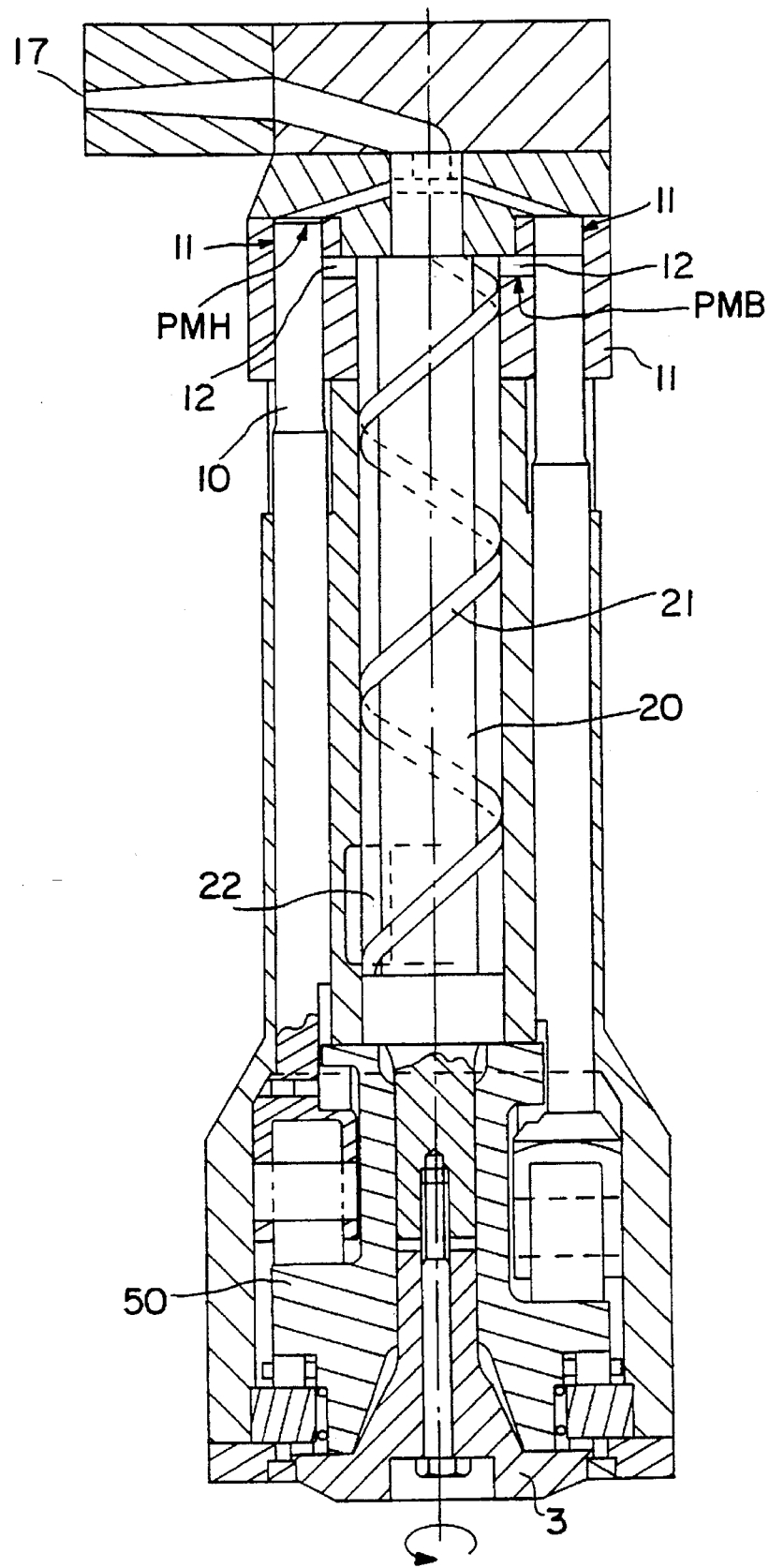
FIG. 7 is an elevational view in section of the pump.

For a total understanding of the invention, reference can be made to U.S. Pat. No. 5,261,795, the description of which is incorporated herein by reference. The first alternative of the invention is illustrated in FIGS. 1 to 3. The second alternative of the invention is illustrated in FIGS. 4 to 6. For an understanding of the pump to which the present invention is applicable, reference can be made to FIG. 7.

FIGS. 1 and 4 show alternative pumps with two delivery pistons 10, the movements of which between bottom dead position and top dead position are parallel to the axis Z of the pump. FIGS. 1 and 4 are sections on a plane containing the axis Z of the pump. The body 1 of the pump can be seen, including a supply opening 22, as well as an outlet orifice 17 shaped appropriately, and having, for example, the appearance of a slit. The pistons 10 are located axially inside the body 1 of the pump.

FIG. 1 shows the pistons 10 each sliding in a cylinder 11 hollowed out from the body 1 of the pump. The cylinders are therefore stationary relative to the body of the pump. A feed screw 21 is shown, turning in a central transfer chamber 20 about which said cylinders 11 are located, the axis of these cylinders being parallel to the axis Z of the pump. Said feed screw 21 is used as mechanical means, the displacement of which provides a forced transfer of the material from the supply opening 22 toward each of said cylinders 10. Ports 12 provide communication between the transfer chamber 20 and the cylinders 11, and thus constitute an inlet passage formed in the body of the pump.

Arrows, such as the one near the right-hand port 12 in FIG. 1, are shown at various points in the drawings. These arrows symbolically indicate the flow of material and help to make the operation of the pump understandable.

The body 1 of the pump includes an intermediate component 1A and a cap 1B which are arranged integral with the body upon assembly and can be considered as functionally forming part of said body. The intermediate component 1A covers the cylinders 11 on the delivery side; it is drilled with passages 1A1 (as many as there are cylinders, and therefore two are shown) connecting a cylinder at the surface of a bearing 1A2 bored concentrically to the axis Z of the pump. The bearing 1A2 supports a rotary distributor, the axis of which is parallel to the direction of movement of the pistons. The rotary distributor member and said bearing are fitted together with a very small clearance; they have matched shapes of revolution. The bearing 1A2 also supports the feed screw 21, directly connected to the distributor. This is highly advantageous because it avoids the screw operating in cantilever fashion, while making it unnecessary to provide a specific support bearing or rolling bearing. The distributor thus designed combines a function of collecting the pumped material and a mechanical bearing function, here again contributing to the highly compact nature of the pump.

Each of these passages 1A1 constitutes a delivery passage formed in said body at a point which is separated from the point where the inlet passage to the same cylinder is formed. The passages 1A1 all emerge at the surface of the bearing 1A2 at points which are uniformly spaced and in line circumferentially. The cap 1B includes a central bore 1B1 conveying the material toward the outlet orifice 17.

The distributor is physically embodied by a rotary valve 6 turning in said bearing 1A2. The bearing 1A2 and the rotary valve here are cylindrical. This rotary valve 6 includes an axial bore 61, as well as a cutout 62, having the appearance of a slit developing perpendicularly to said bore. The bore 61 and the cutout 62 constitute a recess through which the collected material passes in the direction of the outlet orifice 17 of the pump.

In order to provide a delivery flow rate which can be strictly continuous (that is to say, not pulsed) it is preferable to use at least two pistons arranged so that their delivery phases follow each other in sequence. In this case use will advantageously be made of a rotary cam 50 shown in FIGS. 3 and 7, providing movement of the delivery pistons such that the sum of the flow rates delivered is proportional to the speed of rotation of the cam 50.

In the latter case, the ease of use and accuracy of such a pump are such that it is even possible to expel an amount of material which is less than the unitary swept volume of one of the pistons. Thus, the amount of material expelled is directly proportional to the angle through which the control shaft has been turned, even if this angle corresponds to a displacement of the piston which is less than a useful stroke during which the piston effectively delivers material. The amount of rubber delivered by the pump is directly proportional to the total swept angle of its control shaft. In other words, the amount of rubber is directly proportional to the number of turns effected by the control shaft, bearing in mind that a possible fraction of a turn may achieve the desired result in any cycle.

In the application of the invention to the pumping of unvulcanized rubbers (raw material or vulcanizable compositions), a feed screw 21 is provided for propelling the material such that, using one single mechanical shaft 3, not only are the movements both of the pistons 10 and of the rotary distributor controlled (controls which must of course be synchronized), but the movement of the feed screw 21 is also controlled. In an extremely simple embodiment of the present invention, said feed screw 21 turns at the same speed as the cam 50 and as the rotary valve 6.

A constructive alternative is thus proposed, which is of benefit because it leads to a highly compact pump. All that is required is to locate the feed screw 21 in the direct extension of the control shaft 3, to fit the cam 50 directly onto said control shaft 3, and to locate the rotary valve 6 in the direct extension of the feed screw 21. The feed screw 21 and the rotary valve 6 thus form two separated, axially adjacent regions of the same rotary member.

For a more complete understanding of the appropriate way of producing the rotary valve 6 and of organizing the control of the pistons 10, reference should be made to FIGS. 2 and 3 with the explanations given hereinbelow.

FIG. 3 is a diagram representing the rolling path 52 of a follower roller 51 for thrusting in the direction of the top dead position, as well as the rolling path 54 of a follower roller 53 for returning toward the bottom dead position. Of course, one and the same follower roller could provide both the movements toward the top dead position and the movements toward the bottom dead position. The pivots 51A and 53A of the follower rollers 51 and 53 superimposed on FIG. 3 are integral with the same piston 10. The axial movements (movements parallel to the axis Z) of said pivots 51A and 53A and of the top 10A of the corresponding piston 10 are identical: a displacement "z" of the follower rollers 51 and 52 therefore has an identical displacement "z" of the corresponding piston 10 corresponding to it. FIG. 3 shows, in ordinate axis, the position along the axis Z of said pivots of the follower rollers, therefore the position of the corresponding piston 10, relative to an angular abscissa axis representing the angular position of the cam 50.

The diagram of FIG. 3 shows the useful stroke H of a piston: this is the stroke which it effects toward the top dead position, after having closed off the corresponding port 12. This stroke is effected by a ramp portion of the cam 50 of constant slope extending over π-R radians. The magnitude of the angle R characterizes the degree of overlap between the operation in delivery mode of two pistons, the delivery phases of which are successive.

When a follower roller 51 moves along said ramp of constant slope, the piston 10 which is integral with it provides a delivery flow rate of the material which is directly proportional to the speed of rotation of the cam 50 to within the effects attributable to the compressibility of the material.

On either side of this ramp, the cam 50 includes overlap portions R, which start and finish at angular positions separated by $\pi$ radians. As the pistons are themselves diametrically opposed, the groups of follower rollers 51 and 53 each controlling a piston 10 are themselves angularly separated by $\pi$ radians. The overlap portions R are designed so that the sum of the flow rate delivered by the two pistons during their operation in overlap mode is identical to the flow rate delivered by just one of the pistons when its advancement is controlled by the ramp of constant slope. The existence of an overlap between pistons makes it possible to provide accurate and smooth operation.

In the second part of the cam 50 there is a portion for returning each piston toward its bottom dead position, during which movement the port 12 is uncovered, and for then providing a first advancement, of stroke L, for closing off the port.

FIG. 2 is taken along a section which passes through the cutout 62 in the rotary valve 6. At the center, the bore 61 can be seen through which the material moves toward the outlet orifice 17 of the pump. The section plane 1—1 in FIG. 2 passes through the center of the passages 1A1. The angular setting of the rotary valve 6 relative to the cam 50 is such that, at the beginning of the overlap phase, the rotary valve 6 will uncover the passage 1A1 corresponding to the piston 10 whose follower roller 51 is entering the overlap portion preceding the ramp of constant slope. This is the left-hand passage 1A1 in FIG. 2. Note that the stage reached in the operating cycle of the pump, as represented in FIG. 2, is not exactly the same as the one featured in FIG. 1: in the latter figure, the right-hand piston 10 has not yet closed off the port 12, whereas in FIG. 2, the rotary valve 6 is about to uncover the corresponding passage 1A1 (the left-hand one in FIG. 2), which can be done only if the piston 10 has completely closed off the port 12, thus providing sealing between the transfer chamber 20 and the inside of the cylinder 11.

In order to close off the other passage 1A1 at the correct moment, it is appropriate to dimension the barrier 63 formed by the rotary valve 6 to provide the selected overlap. To this end, relative to the line 1—1 of the sectioning plane, on the right-hand passage 1A1 side, the amplitude of the overlap R is indicated in the drawing. FIGS. 2 and 3 correspond exactly to the same stage in the operating cycle. In the knowledge that the line of the section plane AA and the axis line A2 would define the limits of said barrier if the passages 1A1 had a zero dimension in the circumferential direction, the size of the barrier is increased on either side in the circumferential direction by an amount which is proportional to the actual dimension "d" of said passages 1A1. Note also that the line AA passes through the mid-point of the passages 1A1, viewed in the section shown in FIG. 2. The barrier 63 that the rotary valve 6 forms, therefore, extends beyond the arc $\pi$-R by a magnitude given by d/2 where d is the development of said passages 1A1 in the circumferential direction. Thus, when the rotary valve (and therefore the cam 50) has turned through an amount corresponding to the overlap R, the passage 1A1 corresponding to the piston 10 arriving at the top dead position will be closed off, which allows this piston to start back again toward the bottom dead position without drawing in any material.

Note that, without in any way changing either the cam or the rotary valve, it is possible to fit two other pistons midway between the first two. Provided that the feed screw is adapted, this adaptation possibly being made necessary to ensure complete filling of the cylinders, the nominal flow rate of the pump can thus be doubled, all other things being equal. More generally, any even number of pistons can be used with the feed screw and/or useful swept volume of the pistons possibly being adapted in consequence.

It is also possible to use an odd number of pistons, provided that the cam 50 is modified in the light of the explanations given hereinabove.

The second alternative, shown in FIGS. 4 to 6, includes four pistons. This pump is arranged so that an even number of pistons operate in delivery mode simultaneously, these pistons being located opposite each other relative to the axis of the pump. In the case of high stresses, this makes it possible to adequately balance out the loadings to which the pump is subjected.

In this case, said recess or recesses are located axially symmetrically relative to the axis of rotation of the rotary valve 6 forming the rotary distributor. The cam 50 shown in FIG. 6 is split into two identical halves, each developing over an arc of $\pi$ radians. Traveling along each of these halves, there is, in succession, a first connecting portion R followed by a ramp of constant slope developing over $(\pi/2)$-R radians. Just as explained before, the stroke H is the useful stroke during which the piston in question delivers material in the direction of the outlet orifice 17. On the cam 50, we next encounter a second connecting portion R designed so that it complements the first one, then a portion for returning the piston toward the bottom dead position, and finally a portion causing a first advancement in the direction of the top dead position by a magnitude L which is just sufficient to close the ports 12.

According to a principle which is identical to that which was explained for the first alternative, the barriers 63 of the spool 6, which are capable of closing off and uncovering the passages 1A1, are dimensioned as a function of the desired degree of overlap (determined by the angle R) and as a function of the circumferential dimension d of said passages 1A1.

More generally, following the principles explained, it is possible to construct a pump comprising an even number of pistons greater than or equal to four. In particular, with an identical cam 50, it is possible to use a number of pistons which is a multiple of four, these pistons being set at equal distances apart.

In order to make such a pump operate, it can very easily be coupled to a power source imparting a torque to the control shaft 3. For example, the body 1 of the pump can very easily be grasped by a manipulator robot transporting the movement to the control shaft 3 and providing all the desirable displacements depending on the application adopted.

The invention also relates to a method for manufacturing a tire, in which an uncured blank is progressively assembled by laying down the predefined constituents on a rotary support at the desired location, at least some of the rubber constituents being laid down by bringing the outlet orifice of at least one pump according to the invention across in front of said support and by giving said orifice the suitable relative motions with respect to said support while this support is being driven in rotation.

On the basis of the principles explained, it is possible to adapt the pump according to a desired application. The exact form of the distributor, as well as of the device for controlling the movements of the pistons and of said distributor can of course have many variants. It is also possible to close off the inlet passages from the cylinders using a one-piece rotary valve for both intake and delivery. Likewise, the pistons and cylinders may have a very different appearance from that herein illustrated. A piston plunger could be used, in which case the term "cylinder" would rather denote a pumping chamber. Such a pump proves extremely durable and accurate. By using it for materials which are as difficult to pump as vulcanizable rubber compositions of the sort used in the tire industry, it gives reliable service.

We claim:

1. A positive-displacement pump for a viscous rubber-like material, comprising a body including a supply opening for introducing the material into the pump and an outlet orifice for discharging the material from the pump, at least one delivery piston sliding in a cylinder between a bottom position and a top position, a delivery phase occurring during the stroke between the bottom position and the top position, inlet and delivery passages emerging in said cylinder or cylinders, said inlet and delivery passages being formed in said body at points which are separated from one another, each inlet passage being closed off by the delivery piston during its movement from the bottom position in the direction of the top position, a rotary feed screw in a transfer chamber connecting the supply opening and the inlet passage or passages for filling said cylinder or cylinders with said material in the inlet phase, and a rotary distributor provided with a recess in permanent communication with the outlet orifice, said piston or pistons and said distributor being actuated mechanically and synchronously by a single mechanical control shaft, said recess being shaped so that said distributor, through rotating, places a cylinder in communication with said outlet orifice during delivery phases of the corresponding piston and isolates said cylinder from the outlet orifice between delivery phases.

2. A pump according to claim 1, in which the body includes a bearing in which said distributor turns, the distributor and the bearing having matched surfaces of revolution, the recess in said distributor having at least one cutout ending at the surface of revolution of said distributor, and in which pump the body includes as many delivery passages as cylinders, each passage connecting a cylinder and a surface of revolution of said bearing, the delivery passages being uniformly spaced at points along said surface of revolution of said bearing, so that a cutout passes across each of said delivery passages in succession during its rotational movement.

3. A pump according to claim 1, including at least two pistons, a cam driven by said control shaft providing movement of the delivery pistons such that the sum of the flow rates delivered is exactly proportional to the speed of rotation of said control shaft.

4. A pump according to claim 1, including at least two pistons, the pump being arranged so that the delivery phases of said pistons follow each other.

5. A pump according to claim 1, including an even number of pistons greater than or equal to four, the pump being arranged so that an even number of pistons operate in delivery mode simultaneously, these pistons being located opposite each other relative to the central axis of the pump.

6. A pump according to claim 1, in which the recess of said distributor is a bore located coaxially to the axis of rotation of said distributor, said bore communicating with said outlet orifice and with each delivery passage through the cutout.

7. A pump according to claim 1, in which said recess is located symmetrically relative to the axis of rotation of said distributor.

8. A pump according to claim 1, in which the axis of said rotary distributor is located parallel to the direction of movement of the delivery piston or pistons.

9. A positive-displacement pump for a viscous rubber-like material, having a body including a supply opening for introducing the material into the pump, and an outlet orifice for discharging the material from the pump, said pump including at least one delivery piston sliding in a cylinder between a bottom position and a top position, a delivery phase occurring during the stroke between the bottom position and the top position, said pump including inlet and delivery passages emerging in said cylinder or cylinders, said inlet and delivery passages being located in said body at points which are separated from one another, each inlet passage being closed off by the delivery piston during its movement from the bottom position in the direction of the top position, said pump including a rotary feed screw in a transfer chamber between the supply opening and the inlet passage or passages for filling said cylinder or cylinders with said material in the inlet phase, said pump including a rotary distributor mounted on an end of the feed screw and provided with a recess in permanent communication with the outlet orifice, the body including a bearing in which said distributor turns, the latter and said bearing having matched surfaces of revolution, the recess of said distributor including a cutout ending at the surface of revolution of said member, and in which pump the body includes as many delivery passages as cylinders, the delivery passages connecting the cylinders and the surface of revolution of said bearing at points which are uniformly spaced along said surface of revolution of said bearing, so that the cutout passes across each of said passages in succession during its rotational movement, said passages and said cutout being shaped relative to one another so that the rotation of said distributor places a cylinder in communication with said outlet orifice during delivery phases of the corresponding piston and isolates said cylinder from the outlet orifice between the delivery phases.

10. A pump according to claim 9, in which said piston or pistons and said distributor are actuated mechanically and synchronously by one single mechanical control shaft.

11. A pump according to claim 9, including at least two pistons, a cam driven by said control shaft providing movement of the delivery pistons such that the sum of the flow rates delivered is exactly proportional to the speed of rotation of said control shaft.

12. A pump according to claim 9, including at least two pistons, the pump being arranged so that the delivery phases of said pistons follow each other.

13. A pump according to claim 9, including an even number of pistons greater than or equal to four, the pump being arranged so that an even number of pistons operate in delivery mode simultaneously, these pistons being located opposite each other relative to the central axis of the pump.

14. A pump according to claim 9, in which the recess of said distributor is a bore located coaxially to the axis of rotation of said distributor, said bore communicating with said outlet orifice and with each delivery passage through the cutout.

15. A pump according to claim 9, in which said recess is located symmetrically relative to the axis of rotation of said distributor.

16. A pump according to claim 9, in which said rotary distributor is coaxial with the feed screw, said feed screw turning in a central transfer chamber about which said cylinders are located.

17. A pump according to claim 9, in which said feed screw rotates in a central transfer chamber about which said cylinders are located.

18. A pump according to claim 9, in which the axis of said rotary distributor is located parallel to the direction of movement of the delivery piston or pistons.

* * * * *